United States Patent [19]

Knaus

[11] Patent Number: 5,750,584
[45] Date of Patent: May 12, 1998

[54] STABILITY CONTROL AGENT COMPOSITION FOR POLYOLEFIN FOAM

[76] Inventor: Dennis A. Knaus, 1 Andrews Rd., Malvern, Pa. 19355

[21] Appl. No.: 792,126

[22] Filed: Jan. 31, 1997

Related U.S. Application Data

[60] Provisional application No. 60/010,967 Feb. 1, 1996.

[51] Int. Cl.⁶ ........................................... C08J 9/00
[52] U.S. Cl. .................... 521/97; 252/351; 521/79; 521/142; 521/143; 521/144; 521/149
[58] Field of Search ......................... 521/97, 142, 143, 521/144

[56] References Cited

U.S. PATENT DOCUMENTS

| | | |
|---|---|---|
| 3,644,230 | 2/1972 | Cronin . |
| 3,755,208 | 8/1973 | Ehrenfreund . |
| 3,808,300 | 4/1974 | Miyamoto et al. . |
| 4,214,054 | 7/1980 | Watanabe et al. . |
| 4,217,319 | 8/1980 | Komori . |
| 4,331,779 | 5/1982 | Park . |
| 4,347,329 | 8/1982 | Park . |
| 4,633,361 | 12/1986 | Ela et al. . |
| 4,640,933 | 2/1987 | Park . |
| 4,694,027 | 9/1987 | Park . |
| 5,089,533 | 2/1992 | Park . |
| 5,225,451 | 7/1993 | Rogers et al. . |
| 5,290,822 | 3/1994 | Rogers et al. . |
| 5,424,016 | 6/1995 | Kolosowski . |

*Primary Examiner*—Morton Foelak
*Attorney, Agent, or Firm*—Dickinson Wright PLLC

[57] ABSTRACT

A stability control agent composition for foamable polyolefin compositions comprising at least one compound that is a partial ester of fatty acid with polyol, and at least one compound selected from the group consisting of higher alkyl amines, fatty acid amides and/or complete esters of higher fatty acids.

40 Claims, No Drawings

STABILITY CONTROL AGENT COMPOSITION FOR POLYOLEFIN FOAM

CROSS-REFERENCE TO RELATED APPLICATIONS

This application claims the benefit of U.S. Provisional Application No. 60/010,967, filed Feb. 1$^{st}$, 1996 which is herein incorporated by reference.

FIELD OF THE INVENTION

This invention relates to novel polyolefin foamable compositions suitable for manufacturing expanded articles of various kinds, which comprises a stability control composition that aids in the prevention of post-cooling shrinkage and expansion. This invention relates also to a process for forming polyolefin foams and expanded polyolefin foam articles which comprise such stability control composition.

BACKGROUND OF THE INVENTION

It is well known how to prepare olefin polymer foams by heat plastifying a normally solid olefin polymer resin, admixing such heat plastified resin with a volatile blowing agent under heat and pressure to form a flowable gel and, thereafter, extruding the gel into a zone of lower pressure and temperature to activate the blowing agent and expand and cool the gel to form the desired solid olefin foam product.

A problem frequently encountered is shrinkage or expansion of such foam products in fresh or partially cured form (i.e. prior to aging to permit substantially complete release and/or outgassing of the blowing agent from within the cellular structure of the foam). During the aging or curing period, the blowing agent employed gradually diffuses out of the cells in the foam product and air gradually diffuses into the cells in place thereof. There was a time when it was believed that only a halogenated hydrocarbon blowing agent, namely dichlorotetrafluoroethane, was capable of providing sufficient dimensional stability during the curing period to permit the commercially viable manufacture of low density foams of ethylenic polymer resins. That is, only dichlorotetrafluoroethane was believed to diffuse out of the foam cells slowly enough to prevent cell wall collapse while air was slowly diffusing into the cells when the foam was processed without a permeability modifier or stability control agent.

Heretofore permeability modifiers or stability control agents were developed for incorporation into the polyolefin in an attempt to slow the diffusion of blowing agents out of polyolefin foam cells and thereby minimize shrinkage of the foam cells. For purposes of this application, the terms "permeability modifier" and "stability control agent" will be used interchangeably.

As discussed in the following patents, there are several different types of stability control agents used for minimizing cell shrinkage or cell collapse in foam.

U.S. Pat. No. 3,644,230 discusses a method for preventing post extrusion cell collapse in polyolefin foams by the incorporation of a small amount of partial esters of a long chain fatty acids with polyols.

U.S. Pat. No. 3,755,208 discusses a method for preventing post extrusion cell collapse in vinyl copolymer foams by the incorporation of a small amount of partial esters of long chain fatty acids with polyols.

U.S. Pat. No. 4,214,054, discusses the production of polyolefin foams utilizing volatile hydrocarbon blowing agents. Permeability modifiers such as saturated higher fatty acid amides, saturated higher aliphatic amines, and complete esters of saturated higher fatty acids are incorporated into the polyolefin composition prior to foam expansion.

U.S. Pat. No. 4,217,319 discusses the use of a volatile organic as a blowing agent to expand a polyolefin with an ester of a long chain fatty acid and a polyhydric alcohol as a permeation modifier or stability control agent to prevent shrinkage of the expanded polyolefin.

U.S. Pat. No. 4,331,779, discusses ethylenic polymer foams having a copolymer of ethylene with an unsaturated carboxylic acid as a stability control agent.

U.S. Pat. No. 4,347,329, discusses the use of a fatty acid amide such as stearamide for use in polyolefin foams as a stability control agent. U.S. Pat. Nos. 4,368,276 & 4,395,510 further discusses the use of fatty acid amide stability modifier agents to produce polyolefin foams having improved elevated temperature dimensional stability.

U.S. Pat. Nos. 4,640,933; 4,633,361; 4,694,027 discuss the use of a fatty acid amide such as stearamide as a stability control agent for use in polyolefin foams blown with blowing agents selected from the group consisting of (i) isobutane, (ii) a mixture of from 5%–95% isobutane on a molar basis with from 95%–5% of a physical selected from the group consisting of chlorofluorocarbons and fluorocarbons and (iii) a mixture of at least 70% isobutane with other hydrocarbons, chlorocarbons and chlorofluorocarbons.

U.S. Pat. No. 5,424,016 discusses the use of permeability modifiers, such as fatty acid amides and esters, in a quantity sufficient to prevent substantial shrinkage of the foam structure.

The use of such permeability modifiers permit the use of a wider variety of volatile blowing agents. In most cases, the more inexpensive blowing agents, such as isobutane, can only produce viable foams when employed in conjunction with stability control agents.

Although the stability control agents discussed in these patents may be helpful in minimizing the shrinkage of the polyolefin foams blown with volatile organics, neither the foam systems nor the stability control agents heretofore address the problem of post-cooling expansion. For the purposes of this application, the term "post-cooling expansion" will refer to expansion of the foam, in atmospheric conditions, after the foam has cooled. While not wanting to be held to any particular theory, it has been said that post-cooling expansion results from the residual blowing agent releasing from the polymer structure defining the cells into the open area of the cell at a rate faster than it is able to diffuse from the cell.

The post-cooling expansion contributes to a multitude of problems. The post foaming processing of the foam is effected by the change in dimensions and stress resulting from this post-cooling expansion. In particular, whether the foam is extruded into planks, sheets or some other forms, a dimensional change in the foam results in inconsistency and unpredictability in articles formed therefrom. This effect is particularly acute in laminated forms where the post-cooling dimensional change in the foam may provide a cumulative change.

When the foam is wound as sheet on a roll, the layers of foam on the outer portion of the roll tend to expand in turn compressing the inner layers so that a significant amount of the foam is less than its extruded thickness. As an example, a sheet extruded at a 0.250" thickness and wound as a roll may grow to a thickness of about 0.300" in the outer layers, while the inner layers will be compressed to a thickness of about 0.200". Depending on the particulars of the foam type, there may be as much as 50 to 60% of the roll compressed to a thickness below the cooled extruded foam thickness. This variation in thickness and stress in the rolled foam adversely effects the processing of sheets cut from the roll. Specifically, after the foam is freed from the roll and cut, it may tend to grow, shrink and/or relax resulting in changes in thickness, width and/or length of the cut sheet.

Accordingly, the need still exists in the art for relatively low density polyolefin foams that exhibit a high degree of post-cooling dimensional stability with minimal shrinkage and expansion. This, and other objects and advantages of the invention will become apparent from the following detailed description and the appended claims.

SUMMARY OF THE INVENTION

The foregoing and related objectives are attained by the practice of the present invention which, in one aspect, is a stability control agent composition that substantially minimizes post-cooling shrinkage and expansion in olefin polymer foams.

In another aspect, the present invention is a olefin polymer composition with the above-noted stability control agent composition that further comprises a blowing agent and which is thereby expandable to form an expanded article (i.e., a polymer foam) of said polyolefin composition.

Finally, a particularly beneficial aspect of the present invention resides in a method for substantially improving the post-cooling dimensional stability, both shrinkage and expansion, of relatively fresh olefin polymer foams by incorporating therein a stability control composition.

A preferred embodiment of the present invention is a polyethylene foamable composition having an isobutane containing blowing agent, and an adequate amount of a stability control agent composition comprising glycerol monostearate, glycerol distearate or mixtures thereof and stearyl stearamide present in a component range sufficient to stabilize the freshly formed foam so that it maintains its dimension within about 10%, preferably within about 7.5%, more preferably within about 5% of its initial foamed volume in atmospheric conditions.

DETAILED DESCRIPTION OF THE INVENTION

Olefin polymers suitable for use in the practice of the present invention include any extrudable, foamable composition of one or more polyolefin resinous materials. Preferably, the polyolefin resin will have a softening point of less than 130° C., a melt index of about 0.2 to about 20, more preferably between about 0.3 to about 6 decigrams per minute, and a density of about 0.910 to about 0.940, more preferably about 0.916 to about 0.925 grams/cc.

The olefin polymer may be preferably selected from the group consisting of medium density polyethylene, low density polyethylene, linear low-density polyethylene, metallocene-catalyzed polyethylene, polypropylene, polybutylene, and copolymers of olefin monomers having from 2 to about 8 carbon atoms including ethylene copolymers composed of at least 50 mole percent, preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer. Additionally, blends of two or more of such polyolefin resins can also be employed in the practice of the present invention, in particular, copolymers of ethylene with vinyl acetate. Preferably the olefin polymer is selected from the group consisting of low density polyethylene, linear low-density polyethylene, metallocene-catalyzed polyethylene, ethylene-vinylacete copolymers, and mixtures thereof. More preferably, the olefin polymer is a low density polyethylene, linear low-density polyethylene or mixtures thereof.

Examples of copolymers compatible with ethylene and other olefins include but are not limited to vinyl acetate, vinyl chloride, propylene, butene, hexene, acrylic acid and its esters, and methacrylic acid and its esters, and the like. Other polymer that can be blended with the ethylene homopolymer or copolymer may be any polymer compatible with it and include but are not limited to polypropylene, polybutadiene, polyisoprene, polychloroprene, chlorinated polyethylene, high density polyethylenes, polyvinyl chloride, a styrene/butadiene copolymer, a vinyl acetate/ethylene copolymer, an acrylonitrile/butadiene copolymer, a vinyl chloride/vinyl acetate copolymer, and the like.

The olefin polymer composition is expanded to a substantially closed-cell polymeric foam by heat plastifying the polymer resin, admixing with the resin a combination of stability control agents, and blowing agents, and then activating the blowing agents by exposing the admixture to a zone of lower pressure (i.e., atmospheric pressure) to expand the admixture to a substantially closed-cell olefin polymer foam. Using the process of the present invention, polyolefin foams are produced having densities in the range of from about 0.5 to about 20 pounds per cubic foot. The foams preferably have densities in the range of from about 0.6 to about 15 pounds per cubic foot, and more preferably from about 0.9 to 9.0 pounds per cubic foot.

Blowing agents used in the composition and processes of the present invention are normally gaseous elements, compounds or mixtures thereof. Some of the blowing agents that can be used are listed below. The blowing agents listed are examples and are not meant to be construed as limiting this invention to only the blowing agent mentioned.

Among the elemental gases that may be employed with satisfactory results are nitrogen, argon, neon, and helium. In addition, normally gaseous organic compounds may be used. Among the more typical of these are the halogen derivatives of methane and ethane, which are used as refrigerants and for similar purposes, such as trichlorofluoromethane(CFC-11); dichlorodifluoromethane (CFC-12); dichlorotetrafluoroethane (CFC-114); difluorotetrachloroethane(CFC-122); chlorodifluoromethane (HCFC-22); 1,1-dichloro 2,2,2-trifluoroethane (HCFC-123); 1-chloro-1,2,2,2 tetrafluoroethane (HCFC-124); 1,1,2,2,2,-pentafluoroethane (HCFC-125); 1,2,2,2,-tetrafluoroethane (HFC-134a); 1,1-dichloro 1-monofluoroethane (HCFC-141b); 1,-chloro-1,1,-difluoroethane (HCFC-142b); 1,1,-difluoroethane (HFC-152a); ethyl chloride; methyl bromide; methyl chloride and the like, and mixtures of any two or more of the above.

Other normally gaseous compounds that may be employed are acetylene, ammonia, butadiene, normal butane, butene, carbon dioxide, nitrous oxide, cyclopropane, dimethylamine, 2-2-dimethyl propane, ethane, ethylene, isobutane, isobutylene, methane, monomethylamine, propane, propylene and trimethylamine.

Preferably, the blowing agent for the present invention is selected from the group consisting of (i) isobutane, (ii) a mixture of from 5%–95% isobutane on a molar basis with from 95%–5% of a physical blowing agent selected from the group consisting of chlorofluorocarbons and fluorocarbons having from 1 to 4 carbon atoms, (iii) a mixture of at least 5%–95% isobutane with 95%–5% of a physical blowing agent selected from the group consisting of hydrocarbons, chlorocarbons, and chlorofluorocarbons having from 1 to 5 carbon atoms, and (iv) a physical blowing agent made up of one or more selected from the group consisting of hydrocarbons, chlorocarbons, and chlorofluorocarbons having from 1 to 5 carbon atoms.

All of the aforementioned materials are intended to be embraced within the term "normally gaseous, expanding medium" as used herein. This term is intended to mean that the expanding medium employed is a gas at the temperatures existing under the normal operating conditions of a plastic extruder. Also, when reference is made to the introduction of a normally gaseous, expanding medium or a gas into a plastic compound in an extrusion cylinder, it is to be understood that, while the material introduced is a gas at the normal operating temperatures of the extruder, it may be in either gaseous or liquid state at the temperature and pressure at which it is introduced into the extrusion cylinder. It is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents include hydrocarbons, such as: pentane, hexane, heptane or octane; unsaturated hydrocarbons, such as: pentene, 4-methyl pentene, hexene or petroleum ester fractions; ethers such as diethyl ether; alcohols such as: methanol or ethanol; ketones such as: acetone or methyl ethyl ketone; and halogenated hydrocarbons such as: carbon tetrachloride, chloroform, ethylene dichloride, methylene chloride, or 1,1,2-trichloro-1,2,2-trifluoroethane.

Other blowing agents that can be used as supplements to the normally volatile gases are the chemical blowing agents that decompose at elevated temperatures to liberate gases. These blowing agents include: azodicarbonamide, p-toluene sulfonyl hydrazide, dinitrosopentamethylene, mixtures of sodium bicarbonate and citric acid, gypsum, various hydrated aluminas such as aluminum trihydrate, sodium borohydrate and the like.

Blowing agents are usually incorporated in amounts from about 0.05 to about 55 percent by weight based on the polymer. Other ingredients such as fillers, stability control agents, antioxidants, antistatic agents, flame retardant additives, nucleation agents, lubricants, foaming aids, coloring agents, and deterioration inhibitors and the like may also be present in the polyolefin composition. Foamable compositions of polyolefins or their copolymers, blowing agents and additives, e.g., stability control agents, antistatic agents, flame retardant agents and the like, are well known in the art and representative examples of such compositions are set forth in U.S. Pat. Nos. 3,644,230 (Cronin); 4,214,054 (Watanabe et al.); 4,640,933, 4,633,361 and 4,694,027 (Park), the teachings of which are incorporated herein by reference.

Stability control agents are normally added to many polyolefin foams to prevent collapsing of the foam. The combination of stability control agents suitable for use in the present invention include the partial esters of long-chain fatty acids with polyols described in U.S. Pat. No. 3,644,230, combined with at least one of the higher alkyl amines, fatty acid amides and/or complete esters of higher fatty acids such as those described in Watanabe et al. U.S. Pat. No. 4,214,054. The partial esters of fatty acids which are particularly useful as one of the stability control agent components in the composition of this invention include the members of the generic class known as surface active agents or surfactants. A preferred class of surfactants include, for example, a partial ester of a fatty acid having 12 to 18 carbon atoms and a polyol having three to six hydroxyl groups. More preferably, the partial esters of long chain fatty acid with polyol component of the stability control agent combination is glycerol monostearate, glycerol distearate or mixtures thereof.

The other stability control agent component of the combination can be selected from the groups consisting of higher alkyl amines, fatty acid amides and/or complete esters of higher fatty acids. Typical examples of higher alkyl amines that may be useful as a component of the stability control agent mix may include dodecyl amine, tetradecyl amine, hexadecyl amine, octadecyl amine, eicosyl amine, docosyl amine, N-methyl dodecyl amine, N-methyl octadecyl amine, N-ethyl octadecyl amine, dodecyl propylene diamine, tetradecyl propylene diamine, hexadecyl propylene diamine, octadecyl propylene diamine, N-methyl hexadecyl propylene diamine, N,N'-dimethyl hexadecyl propylene diamine, N-methyl octadecyl propylene diamine, N,N'-dimethyl octadecyl propylene diamine, hexadecyl ethylene diamine, octadecyl ethylene diamine, N-methyl hexadecyl ethylene diamine, N-methyl octadecyl ethylene diamine, and the like. Typical examples of the saturated higher aliphatic amine derivatives are polyoxyethylene myristyl amine, polyoxyethylene palmityl amine, polyoxyethylene stearyl amine, polyoxypropylene palmityl amine, polyoxypropylene stearyl amine, miristyl amine acetate, palmityl amine acetate, stearyl amine acetate, polyoxyethylene lauryl amine mono(and di-)palmitate, polyoxyethylene lauryl amine mono(and di-)stearate, and polyoxyethylene palmityl amine mono(and di-)palmitate, polyoxyethylene palmityl amine mono(and di-)stearate, polyoxyethylene stearyl amine mono (and di-)palmitate, polyoxyethylene stearyl amine mono (and di-)stearate, N-methyl polyoxyethylene stearyl amine palmitate, N-ethyl polyoxyethylene stearyl amine stearate, lauryl mono (and di-)ethanolamine palmitate, lauryl mono (and di-)ethanolamine stearate, palmityl mono(and di-) ethanolamine palmitate, palmityl mono(and di-) ethanolamine stearate, stearyl mono (and di-) ethanolamine palmitate, stearyl mono(and di-)ethanolamine stearate, dodecyl propylene diamine oxyethylene addition product, hexadecyl propylene diamine oxyethylene addition product, octadecyl propylene diamine oxyethylene addition product, polyoxyethylene hexadecyl propylene diamine mono(and di-)palmitate, polyoxyethylene hexadecyl propylene diamine mono(and di-)stearate, polyoxyethylene octadecyl propylene diamine mono(and di-)palmitate, polyoxyethylene octadecyl propylene diamine mono(and di-) stearate, and the like.

Typical examples of the saturated fatty acid amides useful in the present invention include lauric acid amide, myristic acid amide, palmitic acid amide, stearic acid amide, arachic acid amide (eicosyl amide), behenic acid amide (docosyl amide), N-methyl stearic acid amide, N,N'-dimethyl stearic acid amide, di-lauric acid amide, di-palmitic acid amide, di-stearic acid amide, tri-lauric acid amide, tri-palmitic acid amide, tri-stearic acid amide, and so on. Examples of saturated higher fatty acid amide derivatives may include lauric acid mono(and di-)ethanolamide, myristic acid mono (and di-)ethanolamide, palmitic acid mono(and di-) ethanolamide, stearic acid mono(and di-)ethanolamide, arachic acid mono(and di-)ethanolamide, behenic acid mono (and di-)ethanolamide, lignoceric acid mono(and di-)

ethanolamide, lauric acid mono-isopropanolamide, palmitic acid mono-isopropanolamide, stearic acid mono-isopropanolamide, polyoxyethylene lauric acid amide, polyoxyethylene myristic acid amide, polyoxyethylene palmitic acid amide, polyoxyethylene stearic acid amide, polyoxyethylene arachic acid amide, di-lauric acid mono-ethanolamide, di-myristic acid mono-ethanolamide, di-palmitic acid mono-ethanolamide, di-stearic acid mono-ethanolamide, di-arachic acid mono-ethanolamide, polyoxyethylene di-stearic acid amide, polyoxyethylene lauric acid amide.mono-stearate, polyoxyethylene stearic acid amide.mono-stearate, and the like.

Typical examples of complete esters of saturated higher fatty acids useful in the stability control agent combination of the present invention includes: polyoxyethylene di-myristate, polyoxypropylene di-myristate, polyoxyethylene di-palmitate, polyoxypropylene di-palmitate, polyoxyethylene di-stearate, polyoxypropylene di-stearate, polyoxyethylene di-arachate, polyoxyethylene di-behenate, ethyleneglycol di-myristate, ethyleneglycol di-palmitate, ethyleneglycol di-stearate, ethyleneglycol di-arachate, ethyleneglycol di-behenate, lauric acid tri-glyceride, myristic acid tri-glyceride, palmitic acid tri-glyceride, stearic acid tri-glyceride, arachic acid tri-glyceride, 1,3-palmito-2-stearic acid glyceride, 1,3-stearo-2-myristic acid glyceride, sorbitane tetra-palmitate, sorbitane tetra-stearate, 12-hydroxy stearic acid tri-glyceride, sorbitane tetra-12-hydroxystearate, mono-stearic acid-di-12-hydroxy-stearic acid tri-glyceride, polyoxyethylene glycerine tristearate, polyoxyethylene glycerine tri-12-hydroxystearate, polyoxyethylene sorbitane tetra-stearate, polyoxyethylene sorbitane tetra-12-hydroxystearate, mono-stearic acid-di-12-hydroxy stearic acid polyoxyethylene tri-glyceride, and the like.

Preferably, the stability control agent combination will comprise compounds that are partial esters of long chain fatty acids with polyols, preferably glycerol monostearate, glycerol distearate or mixtures thereof, in combination with compounds that are N-substituted fatty acid amides, preferably fatty acid amides selected from the group consisting of N-stearyl stearamide, N-palmityl stearamide, N-palmityl palmitamide or mixtures thereof, most preferably stearyl stearamide.

The stability control agent combination may be either pre-mixed or separately added into the olefin composition. The combination is present in the olefin composition in an amount and at a component ratio sufficient to substantially stabilize the foam and prevent post-cooling dimensional changes in the foam, particularly, in the freshly formed foam where such changes most typically occur. The combination may be employed in an amount and at a component ratio to effectively stabilize the foam so that it expands less than 10%, preferably less than 7.5%, more preferably less than 5%, of its initial foamed dimension in atmospheric conditions. This stability control agent combination will typically be present in the olefin composition in an amount between 0.1% and 15% based on the weight of the polymer resin. Preferably, the stability control agent combination will be present in an amount between about 0.1% and about 7%, more preferably between about 0.1% and about 3%, based on the weight of the polymer resin.

The stability control agent combination will comprise at least one partial esters of long chain fatty acid with polyols component and at least enough of a component selected from the groups consisting of higher alkyl amines, fatty acid amides and/or complete esters of higher fatty acids to substantially reduce the post-cooling expansion of the foam. The stability control agent combination will typically comprise at least 50% partial esters of fatty acids with polyols with at least a portion of the balance comprising a component selected from the groups consisting of higher alkyl amines, fatty acid amides and/or complete esters of higher fatty acids. Preferably the stability control agent combination will comprise between about 60% and about 95% of the partial esters of fatty acids with polyols component, more preferably between about 70% and about 90%, and between about 5% and about 40% of a component selected from the groups consisting of higher alkyl amines, fatty acid amides and/or complete esters of higher fatty acids, more preferably between about 10% and about 30%.

Antistatic agents are normally added and mixed into the polyolefin resin prior to extrusion but the process described herein is not limited to this method. Examples of antistatic agents include, but are not limited to the following: anionic surfactants, such as alkyl sulfates, alkyl sulfonates, alkyl benzene sulfonates, sulfosuccinates, and esters of aliphatic alcohols and phosphoric acid and phosphates; cationic surfactants, such as primary amine salts, secondary amine salts, tertiary amine salts, quaternary ammonium compounds and pyridine derivatives, and nonionic surfactants, such as alkylene oxide adducts of aliphatic alcohols, alkylene oxide adducts of a fatty acid, alkylene oxide adducts of alkylphenol and alkyl naphthol, alkylene oxide adducts of polyhydric alcohols, alkylene oxide adducts of aliphatic amines and aliphatic amides, polyethylene glycol, and block copolymers of polyethylene glycol and polypropylene glycol. Nonionic-anionic surfactants, such as mono and diesters of polyoxyethylene alkyl ethers and polyoxyethylene alkyl ether sulfates and polyoxyethylene alkyl phenol ether sulfates are suitable, as are amphoteric surfactants, such as alkyl betaene and imidazoline derivatives. One or more of these or other antistatic agents are added in a quantity of 0.05 to 10 parts, preferably 0.2 to 3 parts, per 100 parts of polyolefin.

Flame retardant additives are generally added and mixed into the polyolefin resin prior to extrusion, but the process described is not limited to this method. Examples of suitable flame retardant additives include halogen containing organic bromine and chlorine compounds such as chloroparaffin. Preferably the flame retardant additive contains at least 50 percent by weight of bromine or chlorine. Examples of the preferred bromine compounds include: 1,2,5,6,9,10-hexabromocyclododecane; tetrabromo-dibenzylacetone; pentabromophenylallylether; pentabromomonochlorocyclohexane; 1,1,2,3,4,4,-hexabromobutene-2,2,5-bis(tribromomethyl)-1,2,3-thiadrazol; 2,4,6-tris(tribromoethyl)-1,3,5-triazine; tetra-bromoethane; bromotrichloromethane; 1,2,5,6-tetrabromohexane; hexabromobenzene; pentabromophenol; pentabromodiphenylether; tris-(dibromopropyl)-phosphate; octabromocyclo-hexadecane; octabromod iphenol oxide; 2,4,6-tribromophenol; decabromodiphenyl oxide; bis(tri-bromophenoxy) ethylene; and bromonaphthalene. One of more of these and other flame retardants are often used in admixture with antimony trioxide or antimony pentoxide to obtain a synergistic effect.

As has been explained, an important feature of the present invention is its ability to utilize low cost blowing agents, such as isobutane, in the foamable olefin composition. Isobutane may be used as the sole blowing agent. Alternatively, the blowing agent may comprise a mixture with one or more conventional blowing agents previously mentioned. In the practice of this invention, the blowing agent is compounded into the olefin polymer composition in proportions to make the desired degree of expansion in the resulting foamed cellular product, usually up to about 60-fold volume expansion to make products having aged foam densities down to about 9.6 kg/m3 (about 0.6 pound per cubic foot). Depending on the starting proportion of blowing agent, the resulting foam products of this invention may have relatively low foam densities, for example, a density of from about 9.6 to about 240 kg/m3 (0.6 to about 15 pounds per cubic foot (pcf). The useful proportions of such blowing agent in compositions of flowable, foamable gel is on the order of from about 0.013 to about 0.50 gram-mole per 100 grams of the starting resin. The maximum useful proportion of blowing agent in the foamable gel is also affected by the pressure which is maintained on the gel in the extruder and extrusion die passage, as well as the channel in communication with both. The level of blowing agent is greater when the extruder and die pressures are relatively high such as when the die orifice is relatively small and/or the through-put rate is relatively large.

The blowing agent is compounded into the olefin composition in a conventional fashion to make a flowable gel, preferably in continuous manner, e.g., in a mixing extruder, using heat to plastify the resin blend, pressure to maintain the blowing agent in non-gaseous state, and mechanical working to obtain a thorough mixing of the resin and blowing agent. The resulting gel is then cooled if necessary and passed through a suitable die orifice into a zone of lower pressure, e.g., normal ambient air temperature, where it expands to a lower density, cellular mass. As the foamed extrusion forms, it is taken away from the extruder, allowed to cool to harden the resin blend, and collected for further processing, storage and subsequent use.

In addition, to the hereinbefore described ingredients, there may also be employed in the practice of the present invention other ingredients or additives which conventionally find applicability in known extrusion foaming processes, such as, for example, known nucleating (or cell-size controlling) agents (e.g., talc, clay, mica, silica, titanium oxide, zinc oxide, calcium silicate, metallic salts of fatty acids such as barium stearate, zinc stearate, aluminum stearate, etc.), wetting agents, antistatic agents, flame retardant agents and the like.

The following examples, in which all parts and percentages are on a weight basis unless otherwise indicated, are presented as illustrative of the present invention and are not to be understood as limiting its scope.

EXAMPLES

A low density polyethylene resin with a melt index of approximately 2.2 decigrams/minute and a density of approximately 0.92 grams/cc, a sufficient amount of isobutane blowing agent to produce a 35 kg/m3(2.2 lbs/ft3) foam, and a single or combination of stability control agents of the type and at the amounts listed in the Table, were added to an extruder to produce a continuous sheet of foam having a measured thickness list in the Table. Talc was also added as a cell size control agent. Samples were retained and their thicknesses were measured by a micrometer immediately after they were made and after they had assumed their greatest post-cooling dimensional change (i.e. expansion or shrinkage).

TABLE

| Sample No | ATMOS 150 (Parts/100 parts polymer) (1) | KEMAMIDE S-180 (Parts/100 Parts polymer) (2) | Initial Thk. (inch) | Maximum/ Minimum Thk. (inch) | Differential Thk. (inch) (3) | % change |
|---|---|---|---|---|---|---|
| 1 | 1.5 | 0 | 0.420 | 0.495 | +0.075 | +17.85 |
| 2 | 1.5 | 0 | 0.409 | 0.486 | +0.077 | +18.82 |
|   |     |   |       | Average | % Change | +18.33 |
| 3 | 0 | 1.5 | 0.408 | 0.327 | −0.081 | −19.85 |
| 4 | 0 | 1.5 | 0.401 | 0.317 | −0.084 | −20.94 |
| 5 | 0 | 1.5 | 0.352 | 0.286 | −0.066 | −18.75 |
| 6 | 0 | 1.5 | 0.382 | 0.295 | −0.087 | −22.77 |
|   |   |     |       | Average | % Change | −20.82 |
| 7 | 1.125 | .375 | 0.440 | 0.464 | +0.024 | +5.45 |
| 8 | 1.125 | .375 | 0.433 | 0.444 | +0.011 | +2.54 |
| 9 | 1.125 | .375 | 0.468 | 0.484 | +0.016 | +3.42 |
| 10 | 1.125 | .375 | 0.421 | 0.452 | +0.031 | +7.36 |
|   |       |      |       | Average: | % Change | +4.69% |

Notes:
1) Food grade Atmos ™ 150 type partial esters of a long chain fatty acid with polyols sold by Humko Chemical Division of Witco Corporation. The composition is understood to be predominantly a mixture of glycerol mono- and distearate.
2) Commercial grade Kemamide ™ S-180 type fatty acid amide sold by Humko Chemical Division of Witco Corporation. The predominant component is understood to be N-octadecyl octadecanamide.
3) The difference between the initial thickness and the maximum/minimum thickness.

The results in the table show that the dimensional stability of the samples containing only Atmos-150 or Kemamide S-180 as the sole stability control agents are unsatisfactory. The samples made with Atmos-150 post expanded an average of 18.33% while the samples made with Kemamide S-180 shrank an average 20.82%. However, the results demonstrate that a significant improvement is provided by incorporating a combination of the two stability control agents. Specifically, the results indicate that by using a mixture of Atmos-150 and Stearyl Stearamide S-180 for stability control, a foam blown with isobutane can be produced that is dimensionally stable and experiences only minimal dimensional change, i.e., an average of 4.69%.

While a particular compositions have described, the above description is intended to convey an understanding of the present invention. Modifications within the scope of the invention will be obvious to those skilled in the art. Therefore, the scope of the invention should be determined solely by reference to the appended claims.

What is claimed is:

1. An expandable polyolefin composition comprising:
   a. an olefin polymer resin;
   b. a stability control agent combination comprising
      i) at least one compound that is a partial ester of a fatty acid with polyol, and
      ii) at least one compound selected from the group consisting of higher alkyl amines, fatty acid amides and/or complete esters of higher fatty acids; and
   c. a blowing agent.

2. The composition of claim 1 wherein said compounds of said combination are present in a sufficient ratio and amounts to prevent an expanded foam form of said composition from expanding by more than 10% from its initial foamed dimension in atmospheric conditions.

3. The composition of claim 2 wherein said foam expands less than 7.5%.

4. The composition of claim 2 wherein said foam expands less than 5%.

5. The composition of claim 1 wherein said combination of stability control agents is present in an amount between 0.1 and 15% by weight based on the weight of the polymer resin.

6. The composition of claim 5 wherein said combination comprises at least about 50% of component (b)(i) compounds.

7. The composition of claim 5 wherein said combination comprises between about 60% and about 95% component (b)(i) compounds and between about 5% and about 40% (b)(ii) compounds.

8. The composition of claim 5 wherein said combination comprises between about 70% and about 90% component (b)(i) compounds and between about 10% and about 30% (b)(ii) compounds.

9. The composition of claim 1 wherein said combination of stability control agents is present in an amount between 0.1 and 7% by weight based on the weight of the polymer resin.

10. The composition of claim 9 wherein said combination comprises at least about 50% of component (b)(i) compounds.

11. The composition of claim 9 wherein said combination comprises between about 60% and about 95% component (b)(i) compounds and between about 5% and about 40% (b)(ii) compounds.

12. The composition of claim 9 wherein said combination comprises between about 70% and about 90% component (b)(i) compounds and between about 10% and about 30% (b)(ii) compounds.

13. The composition of claim 1 wherein said combination of stability control agents is present in an amount between 0.1 and 3% by weight based on the weight of the polymer resin.

14. The composition of claim 13 wherein said combination comprises at least about 50% of component (b)(i) compounds.

15. The composition of claim 13 wherein said combination comprises between about 60% and about 95% component (b)(i) compounds and between about 5% and about 40% (b)(ii) compounds.

16. The composition of claim 13 wherein said combination comprises between about 70% and about 90% component (b)(i) compounds and between about 10% and about 30% (b)(ii) compounds.

17. The composition of claim 1 wherein component (b)(i) is a partial ester of a fatty acid having 12 to 18 carbon atoms and a polyol having three to six hydroxyl groups.

18. The composition of claim 1 wherein component (b)(i) is glycerol monostearate, glycerol distearate or mixtures thereof.

19. The composition of claim 1 wherein component (b)(ii) is an N-substituted fatty acid amide.

20. The composition of claim 1 wherein component (b)(ii) is N-stearyl stearamide, N-palmityl stearamide, N-palmityl palmitamide or mixtures thereof.

21. The composition of claim 1 wherein component (b)(ii) is stearyl stearamide.

22. The composition of claim 1 wherein component (b)(i) is glycerol monostearate, glycerol distearate or mixtures thereof and component (b)(ii) is N-stearyl stearamide, N-palmityl stearamide, N-palmityl palmitamide or mixtures thereof.

23. The composition of claim 22 wherein said combination of stability control agents is present in an amount between 0.1 and 7% by weight based on the weight of the polymer resin.

24. The composition of claim 23 wherein said combination comprises at least about 50% of component (b)(i) compounds.

25. The composition of claim 23 wherein said combination comprises between about 60% and about 95% component (b)(i) compounds and between about 5% and about 40% (b)(ii) compounds.

26. The composition of claim 23 wherein said combination comprises between about 70% and about 90% component (b)(i) compounds and between about 10% and about 30% (b)(ii) compounds.

27. An expandable polyolefin composition comprising:
   a. an olefin polymer resin selected from the group consisting of low density polyethylene, linear low density polyethylene and mixtures thereof;
   b. a stability control agent combination comprising
      (i) at least one compound that is a partial ester of a fatty acid having 12 to 18 carbon atoms and a polyol having three to six hydroxyl groups; and
      (ii) at least one compound that is an N-substituted fatty acid amide; and
   c. a blowing agent containing isobutane; and
   wherein said stability control agent is present in an amount between 0.1 and 3% by weight based on the weight of the polymer and said combination comprises between about 60% and about 95% component (b)(i) compounds and between about 5% and about 40% (b)(ii) compounds.

28. The composition of claim 27 wherein component (b)(i) is glycerol monostearate, glycerol distearate or mixtures thereof.

29. The composition of claim 28 wherein component (b)(ii) is N-stearyl stearamide, N-palmityl stearamide, N-palmityl palmitamide or mixtures thereof.

30. The composition of claim 28 wherein component (b)(ii) is stearyl stearamide.

31. An expanded article of an olefin polymer comprising a substantially closed-cell foam having a density of about 0.6 to about 15 pounds per cubic foot and being composed of a polymer composition comprising:
   a. an olefin polymer; and
   b. a stability control agent combination comprising
      i) at least one compound that is a partial ester of a fatty acid having 12 to 18 carbon atoms and a polyol having three to six hydroxyl groups, and
      ii) at least one compound selected from the group consisting of higher alkyl amines, fatty acid amides and/or complete esters of higher fatty acids.

32. The article of claim 31 wherein said compounds of said combination are present in a sufficient ratio and amounts to prevent an expanded foam form of said composition from expanding by more than 10% from its initial foamed dimension in atmospheric conditions.

33. The article of claim 32 wherein said foam expands less than 7.5%.

34. The article of claim 32 wherein said foam expands less than 5%.

35. The article of claim 31 wherein said combination of stability control agents is present in an amount between 0.1 and 15% by weight based on the weight of the polymer.

36. The article of claim 35 wherein said combination comprises at least about 50% of component (b)(i) compounds.

37. The article of claim 35 wherein said combination comprises between about 60% and about 95% component (b)(i) compounds and between about 5% and about 40% (b)(ii) compounds.

38. The article of claim 35 wherein said combination comprises between about 70% and about 90% component (b)(i) compounds and between about 10% and about 30% (b)(ii) compounds.

39. The article of claim 31 wherein said combination of stability control agents is present in an amount between 0.1 and 7% by weight based on the weight of the polymer resin.

40. The article of claim 39 wherein said combination comprises between about 70% and about 90% component (b)(i) compounds and between about 10% and about 30% (b)(ii) compounds.

* * * * *